US008675225B2

(12) United States Patent
Doi

(10) Patent No.: US 8,675,225 B2
(45) Date of Patent: Mar. 18, 2014

(54) IMAGE FORMING APPARATUS FOR HANDLING MISSING PAGE

(75) Inventor: Toshihiro Doi, Tokyo (JP)

(73) Assignee: Oki Data Corporation, Tokyo (JP)

( * ) Notice: Subject to any disclaimer, the term of this patent is extended or adjusted under 35 U.S.C. 154(b) by 379 days.

(21) Appl. No.: 12/751,210

(22) Filed: Mar. 31, 2010

(65) Prior Publication Data

US 2010/0253961 A1 Oct. 7, 2010

(30) Foreign Application Priority Data

Apr. 2, 2009 (JP) ................................ 2009-090401

(51) Int. Cl.
*G06F 15/00* (2006.01)

(52) U.S. Cl.
USPC .......................... 358/1.15; 358/1.13; 358/401

(58) Field of Classification Search
USPC ................................................ 358/401, 1.15
See application file for complete search history.

(56) References Cited

U.S. PATENT DOCUMENTS

2004/0119998 A1* 6/2004 Xiong .......................... 358/1.13
2008/0130037 A1* 6/2008 Tamayo et al. .............. 358/1.15
2010/0302601 A1* 12/2010 Mori ............................ 358/401

FOREIGN PATENT DOCUMENTS

JP 2002-157102 A 5/2002
JP 2007-201548 A 8/2007
JP 2008-072281 3/2008

OTHER PUBLICATIONS

Machine translation for JP2007-201548, IDS.*
Machine translation for JP2002-157102, IDS.*

* cited by examiner

*Primary Examiner* — Qian Yang
(74) *Attorney, Agent, or Firm* — Kubotera & Associates, LLC

(57) ABSTRACT

An image forming apparatus includes an image reading portion for reading an image of an original to generate image data; a printing portion for printing the image on a medium according to the image data; a missing page determining portion for determining whether a missing page of the original occurs according to the image data generated with the image reading portion; and a discharge position control portion for discharging the medium corresponding to the missing page of the original to a specific discharge position different from that of other medium.

18 Claims, 14 Drawing Sheets

| Sheet number | Determination |
|---|---|
| 1 | Missing page does not occur |
| 2 | Missing page does not occur |
| 3 | Missing page does not occur |
| 4 | Missing page does not occur |
| 5 | Missing page occurs |
| 7 | Missing page occurs |
| 8 | Missing page does not occur |
| 9 | Missing page does not occur |
| 10 | Missing page does not occur |
| 11 | Missing page does not occur |
| 12 | Missing page does not occur |

IMAGE FORMING APPARATUS FOR HANDLING MISSING PAGE

BACKGROUND OF THE INVENTION AND RELATED ART STATEMENT

The present invention relates to an image forming apparatus.

Among conventional image forming apparatus such as a printer, a copier, a facsimile, a multi function product and the like, a conventional copier, for example, is provided with a scanner portion and a printer portion. After the scanner portion reads an image of an original to generate image data, the printer portion performs a printing operation according to the image data sent from the scanner portion. Accordingly, the image of the original is formed on a sheet as a medium, thereby performing a copying operation.

In the conventional copier, when the scanner portion reads images of a plurality of originals assigned with numbers representing pages, i.e., sheet numbers, if a specific page of the originals is missing or more than two pages are transported to cause a missing page, a notice of an occurrence of the missing page is displayed on a display (a liquid crystal display portion) of an operational panel, or a sheet number of the missing page is displayed on the display (refer to Patent Reference).

Patent Reference Japanese Patent Publication No. 2008-72281

In the conventional copier, when the specific original page is missing from a bundle of copied sheets, it is difficult for an operator to identify the specific original page.

In view of the problems described above, an object of the present invention is to provide an image forming apparatus capable of solving the problems, and capable of easily identify a specific original page from a bundle of copied sheets when the specific original page is missing from the bundle of the copied sheets.

Further objects and advantages of the invention will be apparent from the following description of the invention.

SUMMARY OF THE INVENTION

In order to attain the objects described above, according to an aspect of the present invention, an image forming apparatus includes an image reading portion for reading an image of an original to generate image data; a printing portion for printing the image on a medium according to the image data; a missing page determining portion for determining whether a missing page of the original occurs according to the image data generated with the image reading portion; and a discharge position control portion for discharging the medium corresponding to the missing page of the original to a specific discharge position different from that of other medium.

In the aspect of the present invention, the image forming apparatus includes the image reading portion for reading the image of the original to generate the image data; the printing portion for printing the image on the medium according to the image data; the missing page determining portion for determining the missing page of the original occurs according to the image data generated with the image reading portion; and the discharge position control portion for discharging the medium corresponding to the missing page of the original to the specific discharge position different from the other medium.

In particular, the discharge position control portion discharges the medium corresponding to the missing page of the original to the specific discharge position different from the other medium. Accordingly, it is possible for an operator to identify an occurrence of the missing page simply through confirming the medium discharged to the specific discharge position different from the other medium. Further, it is possible for the operator to easily identify the missing page of the original from a bundle of copied media.

DETAILED DESCRIPTION OF THE PREFERRED EMBODIMENTS

Hereunder, embodiments of the present invention will be explained with reference to the accompanying drawings. In the following description, a copier will be explained as an image forming apparatus.

First Embodiment

Figure 1:
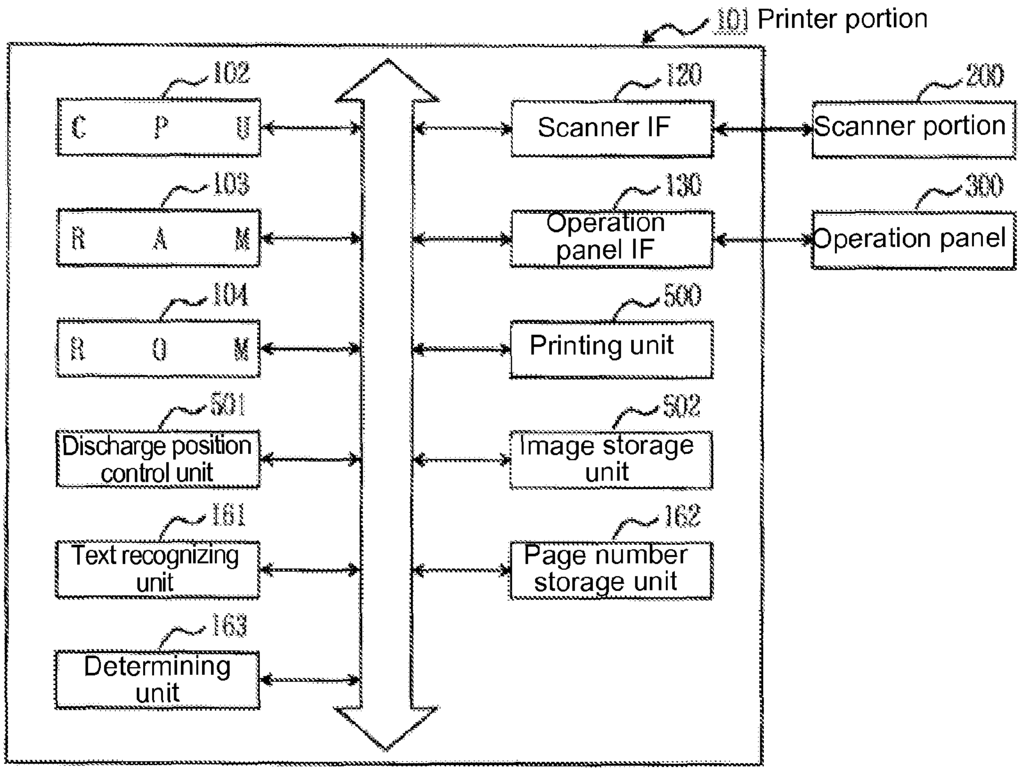
FIG. 1 is a block diagram showing a control system of a copier according to a first embodiment of the present invention.
Figure 2:
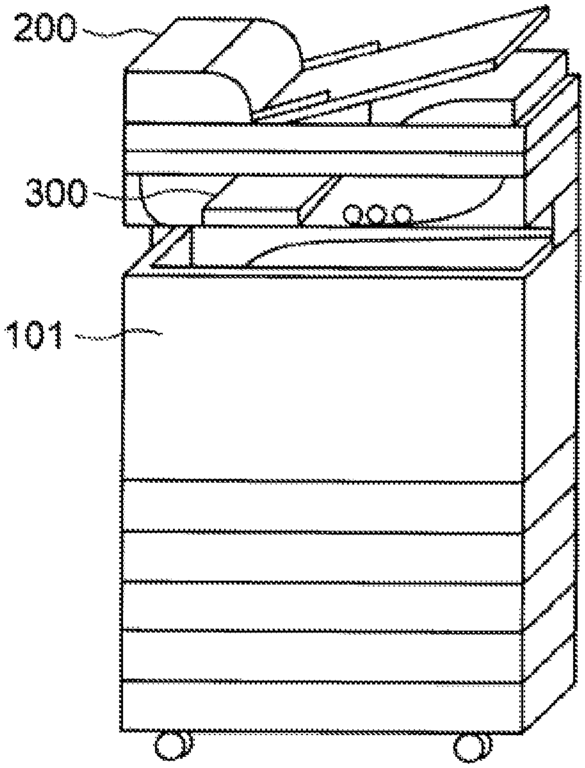
FIG. 2 is a schematic perspective view showing the copier according to the first embodiment of the present invention.

A first embodiment of the present invention will be explained. FIG. 1 is a block diagram showing a control system of a copier according to the first embodiment of the present invention. FIG. 2 is a schematic perspective view showing the copier according to the first embodiment of the present invention.

As shown in FIG. 1, the copier includes a printer portion 101 as an image forming portion; a scanner portion 200 as an image reading portion for reading an image of an original (not shown) to generate image data; and an operation panel 300 as an operation portion. The printer portion 101, the scanner portion 200, and the operation panel 300 constitute the copier.

In the embodiment, the printer portion 101 includes a CPU (Central Processing Unit) 102 as a calculation unit; an RAM (Random Access Memory) 103 as a first storage unit; an ROM (Read Only Memory) 104 as a second storage unit; a scanner IF (Interface) 120 for connecting with the scanner portion 200; an operation panel IF 130 for connecting with the operation panel 300; a printing unit 500 for performing a printing operation; a discharge position control unit 501 for controlling a job separation mechanism of the printing unit 500; and an image storage unit 502 as a first storage portion for storing the image data sent from the scanner portion 200.

In the embodiment, the printer portion 101 includes a text recognizing unit 161 for retrieving a sheet number from a specific region (described later) of the image data stored in the image storage unit 502 to recognize a page number according to the sheet number; a page number storage unit 162 as a second storage portion for storing the page number recognized with the text recognizing unit 161; and a determining unit 163 for determining a missing page according to the page number stored in the page number storage unit 162. The sheet number represents a serial number of each page of the original, and the page number represents a total number of the pages.

In the embodiment, the text recognizing unit 161, the page number storage unit 162, and the determining unit 163 constitute a missing page determining portion for determining whether a missing page occurs. Further, the CPU 102, the RAM 103, the ROM 104, and the missing page determining portion constitute a control unit for controlling an entire operation of the printer portion 101.

Figure 3:
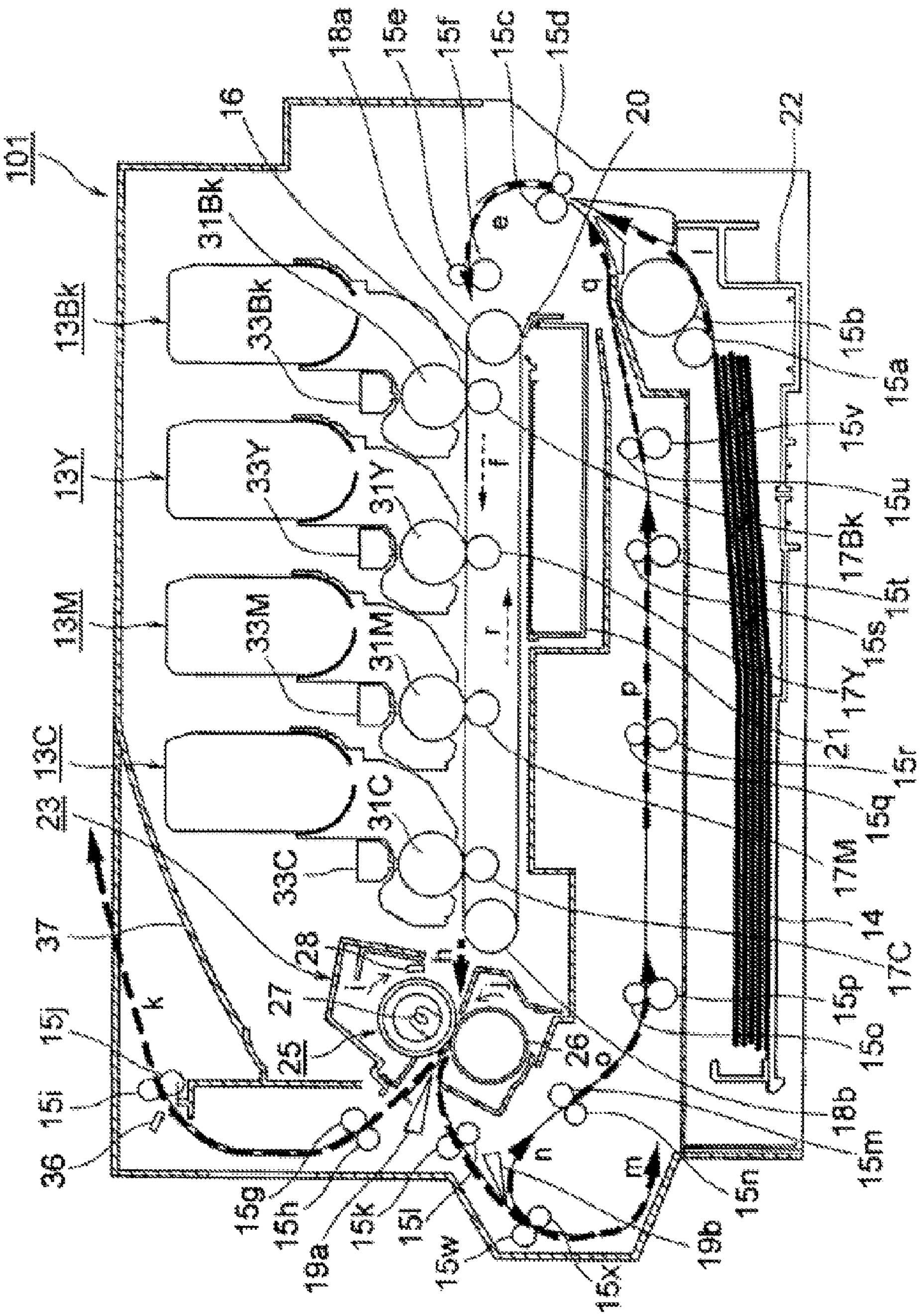
FIG. 3 is a schematic sectional view showing a printer portion of the copier according to the first embodiment of the present invention.

The printer portion 101 will be explained next. FIG. 3 is a schematic sectional view showing the printer portion 101 of the copier according to the first embodiment of the present invention.

As shown in FIG. 3, the printer portion 101 includes image forming units (ID units) 13Bk, 13Y, 13M, and 13C for forming images in black, yellow, magenta, and cyan. The image forming units 13Bk, 13Y, 13M, and 13C include photosensitive drums 31Bk, 31Y, 31M, and 31C as image supporting members for each color, respectively.

In the embodiment, the printer portion 101 further includes a sheet cassette 22 as a medium storage unit for storing a sheet 14 as a medium; transportation rollers 15*a* to 15*h* and 15*k* to 15*x* for transporting the sheet 14; discharge rollers 15*i* and 15*j* for discharging the sheet 14 on a stacker 37 as a medium discharge unit situated outside the printer portion 101; a transfer belt 16 as a first transfer unit or a transportation unit to be movable in arrow directions f and r along the image forming units 13Bk, 13Y, 13M, and 13C for transporting the sheet 14; rollers 18*a* and 18*b* for extending the transfer belt 16; and transfer rollers 17Bk, 17Y, 17M, and 17C as a second transfer unit arranged to face the photosensitive drums 31Bk, 31Y, 31M, and 31C through the transfer belt 16 for overlapping and transferring toner images as developer images in each color to the sheet 14 when the transfer belt 16 moves to form toner images in colors.

In the embodiment, the printer portion 101 further includes sheet transporting guides 19*a* and 19*b* as a movable medium guide member for guiding the sheet 14; a cleaning blade 20 as a cleaning member for removing toner as developer attached to the transfer belt 16; a waste developer tank 21 for collecting toner removed with the cleaning blade 20; a fixing device 23 as a fixing unit for fixing the toner images formed on the sheet 14; LED (Light Emitting Diode) heads 33Bk, 33Y, 33M, and 33C as exposure units in each color arranged to face the photosensitive drums 31Bk, 31Y, 31M, and 31C; a job separation mechanism 36 for discharging the sheet 14 at different discharge positions according to each print job; and the like.

In the embodiment, the fixing device 23 includes a heating roller 25 as a first roller to be rotatable in an arrow direction i; a heating member 27 formed of a halogen lamp and disposed in a metal shaft of the heating roller 25; a pressing roller 26 as a second roller to be rotatable in an arrow direction j for forming a pressing portion with the heating roller 25; and a thermistor 28 as a surface temperature detection unit disposed near the heating roller 25 not to contact with the heating roller 25 for detecting a surface temperature of the heating roller 25.

In the embodiment, the heating roller 25 includes the metal shaft formed of aluminum and having a cylindrical shape; a heat resistance elastic layer formed of a silicone rubber and covering the metal shaft; and a PFA (tetrafluoroethylene-perfluoroalkylvinylether copolymer) tube covering the heat resistance elastic layer. Similarly, the pressing roller 26 includes a metal shaft formed of aluminum; a heat resistance elastic layer formed of a silicone rubber and covering the metal shaft; and a PFA tube covering the heat resistance elastic layer.

Figure 4:
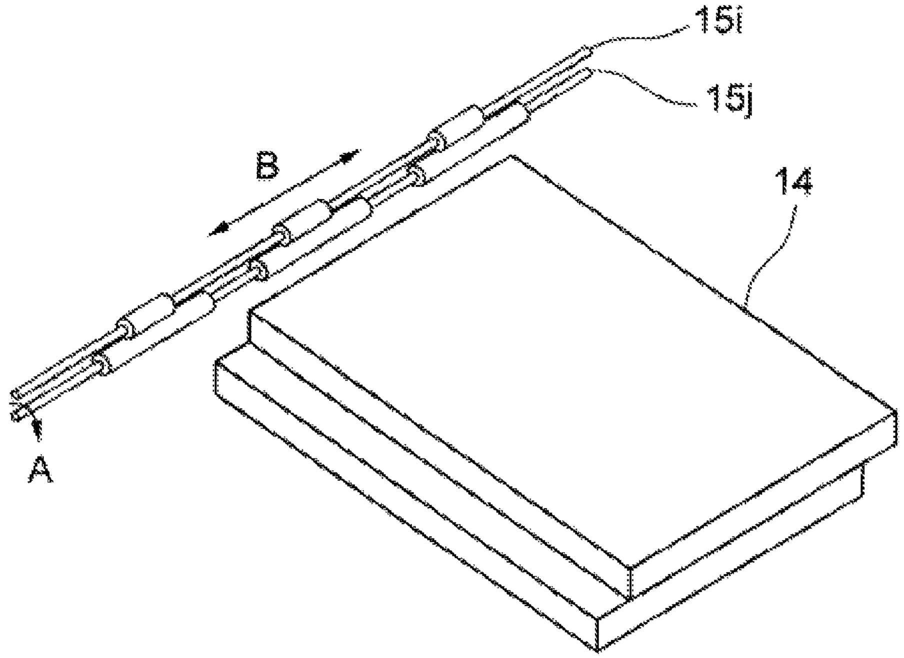
FIG. 4 is a schematic perspective view showing a medium discharging portion of the copier according to the first embodiment of the present invention.

A medium discharging portion will be explained next. The medium discharging portion includes the discharge rollers 15*i* and 15*j*, and the job separation mechanism 36. FIG. 4 is a schematic perspective view showing the medium discharging portion of the copier according to the first embodiment of the present invention.

As shown in FIG. 4, a motor (not shown) as a drive unit is driven to rotate the discharge roller 15*j* in an arrow direction A. The discharge roller 15*j* follows rotations of the discharge roller 15*i* to rotate.

In the embodiment, when the sheet 14 is discharged to the stacker 37 (refer to FIG. 3), the job separation mechanism 36 is operated according to an instruction of the discharge position control unit 501 (refer to FIG. 1). When the discharge roller 15*i* is selectively moved in an axial direction (an arrow direction B), it is possible to discharge the sheet 14 to a plurality of discharge positions. In particular, it is possible to discharge the sheet 14 to a normal separation position as a first discharge position and a different separation position as a second discharge position. Accordingly, it is possible to discharge the sheet 14 to the different discharge positions according to the print job.

Figure 5:
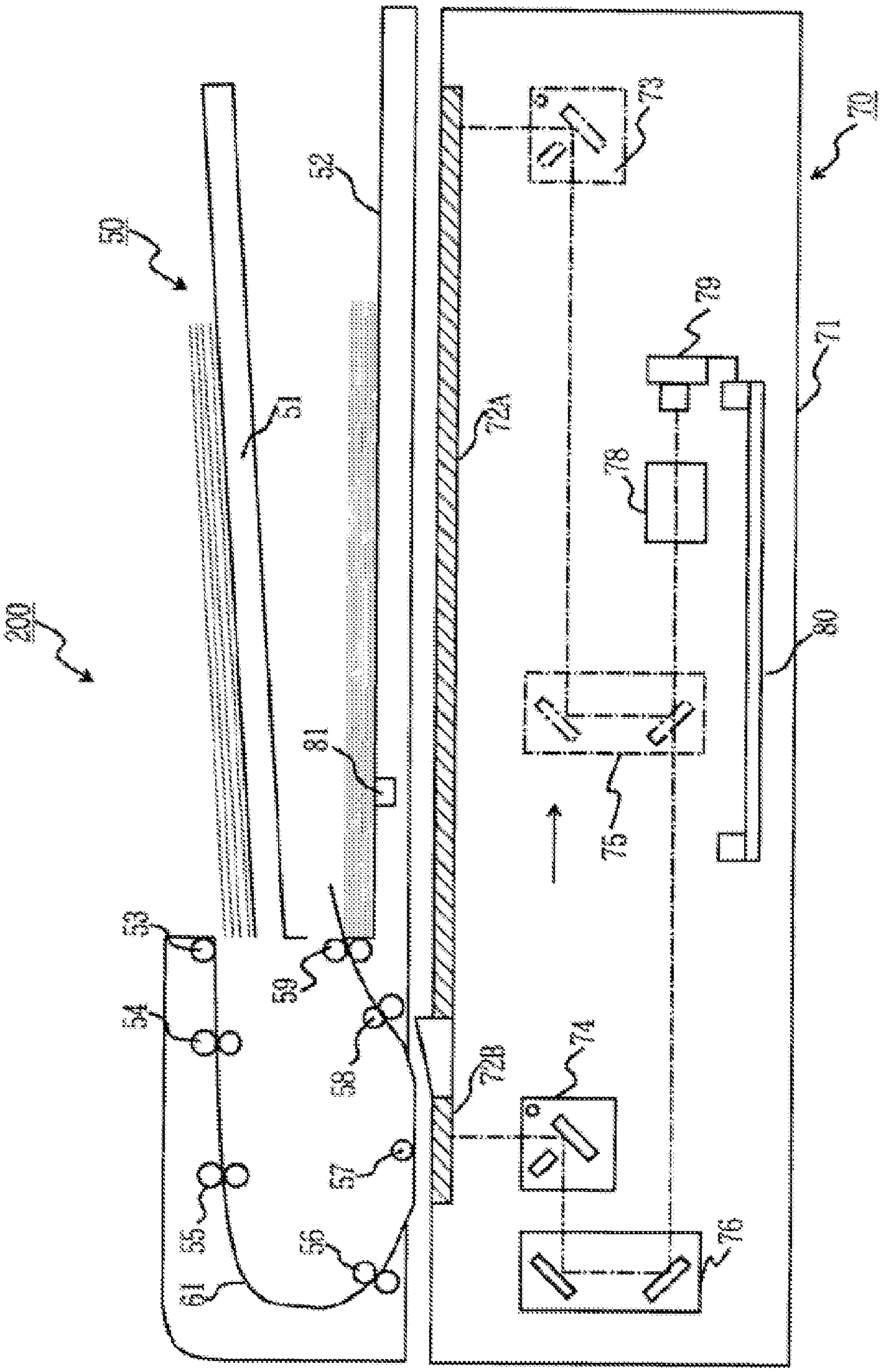
FIG. 5 is a schematic sectional view showing a scanner portion of the copier according to the first embodiment of the present invention.

The scanner portion 200 will be explained next. FIG. 5 is a schematic sectional view showing the scanner portion 200 of the copier according to the first embodiment of the present invention.

As shown in FIG. 5, the scanner portion 200 includes an original transportation mechanism portion 50 and a reading mechanism portion 70. The original transportation mechanism portion 50 includes an original placing portion 51 for placing an original bundle formed of a plurality of originals; an original discharge portion 52 disposed below the original placing portion 51 for placing the originals after the originals are completely read; and a transportation roller 53 for picking up and transporting the originals on the original placing portion 51.

In the embodiment, a roller pair 54 formed of a feed roller and a retard roller is disposed on a downstream side of the transportation roller 53 in a transportation path 61. The roller pair 54 constitutes a separation mechanism for separating the originals one by one.

In the embodiment, various transportation rollers are arranged on a downstream side of the roller pair 54 in the transportation path 61. More specifically, a pre-register roller 55 is provided for transporting the original separated one by one, so that the original has a loop portion. A register roller 56 is provided for transporting the original at a specific timing after the register roller 56 stops temporarily, thereby performing register adjustment. A platen roller 57 is provided for assisting the transportation of the original while the reading mechanism portion 70 reads the original. An outer roller 58 is provided for transporting the original further toward a downstream side after the reading mechanism portion 70 reads the original. A discharge roller 59 is provided for discharging the original to the original discharge portion 52.

In the embodiment, the reading mechanism portion 70 includes an apparatus frame 71 as a housing of the copier. The apparatus frame 71 supports the original transportation mechanism portion 50 to be freely opened and closed.

In the embodiment, the reading mechanism portion 70 further includes a first platen glass 72A for setting the original in a stationary state; a second platen glass 72B formed of a transparent material and having an opening portion for reading the original transported with the original transportation mechanism portion 50; a full rate carriage 73 disposed below the first platen glass 72A for scanning an entire area of the first platen glass 72A to read an image on the original; a full rate carriage 74 for reading an image on the original passing on the second platen glass 72B; a lens 78; half rate carriages 75 and 76 for supplying light obtained with the full rate carriages 73 and 74 to the lens 78; and a CCD (Charge Coupled Device) image sensor 79 as an image forming portion.

In the embodiment, the lens 78 optically converges light obtained with the full rate carriages 73 and 74. Further, the CCD image sensor 79 focuses an optical image formed with the lens 78, thereby performing optical-electrical conversion.

In the embodiment, the reading mechanism portion 70 further includes a control image processing unit 80. The control image processing unit 80 performs a specific process on the image data of the image on the original input with the CCD image sensor 79. Accordingly, the control image processing unit 80 sends the image data to the printer portion 101 through the scanner IF 120, and stores the image data in the image storage unit 502.

Figure 6:
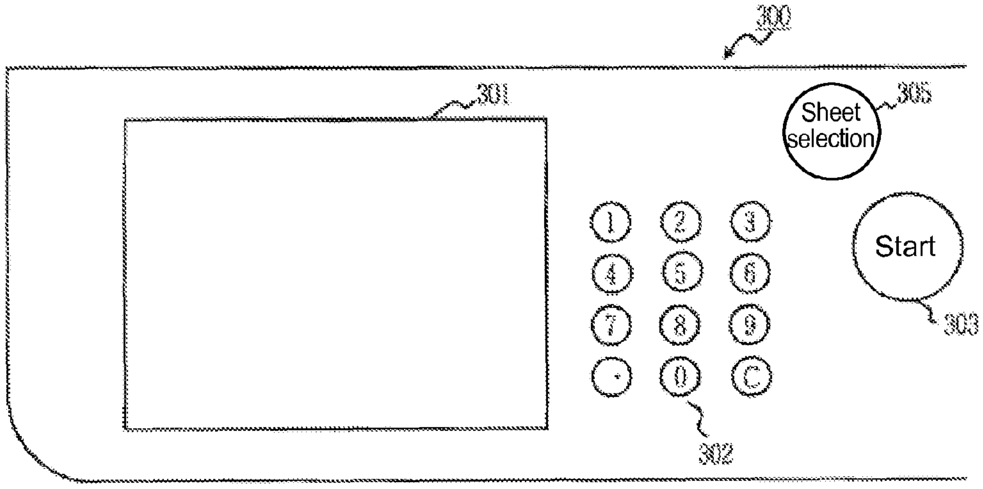
FIG. 6 is a schematic plan view showing an operation panel of the copier according to the first embodiment of the present invention.

FIG. 6 is a schematic plan view showing the operation panel 300 of the copier according to the first embodiment of the present invention. As shown in FIG. 6, the operation panel 300 includes a display 301 as a display portion; a ten-key 302 as an input portion for inputting a copy sheet number (a number of print sheets) at the printer portion 101; a sheet selection button 305 for selecting a size of the sheet 14 (refer to FIG. 3) and a transportation direction thereof; and a start button 303 as a start portion for instructing a start of a copying operation of the copier.

An operation of the copier when the copier reads the images of the originals placed on the original placing portion 51 will be explained next.

Figure 7:
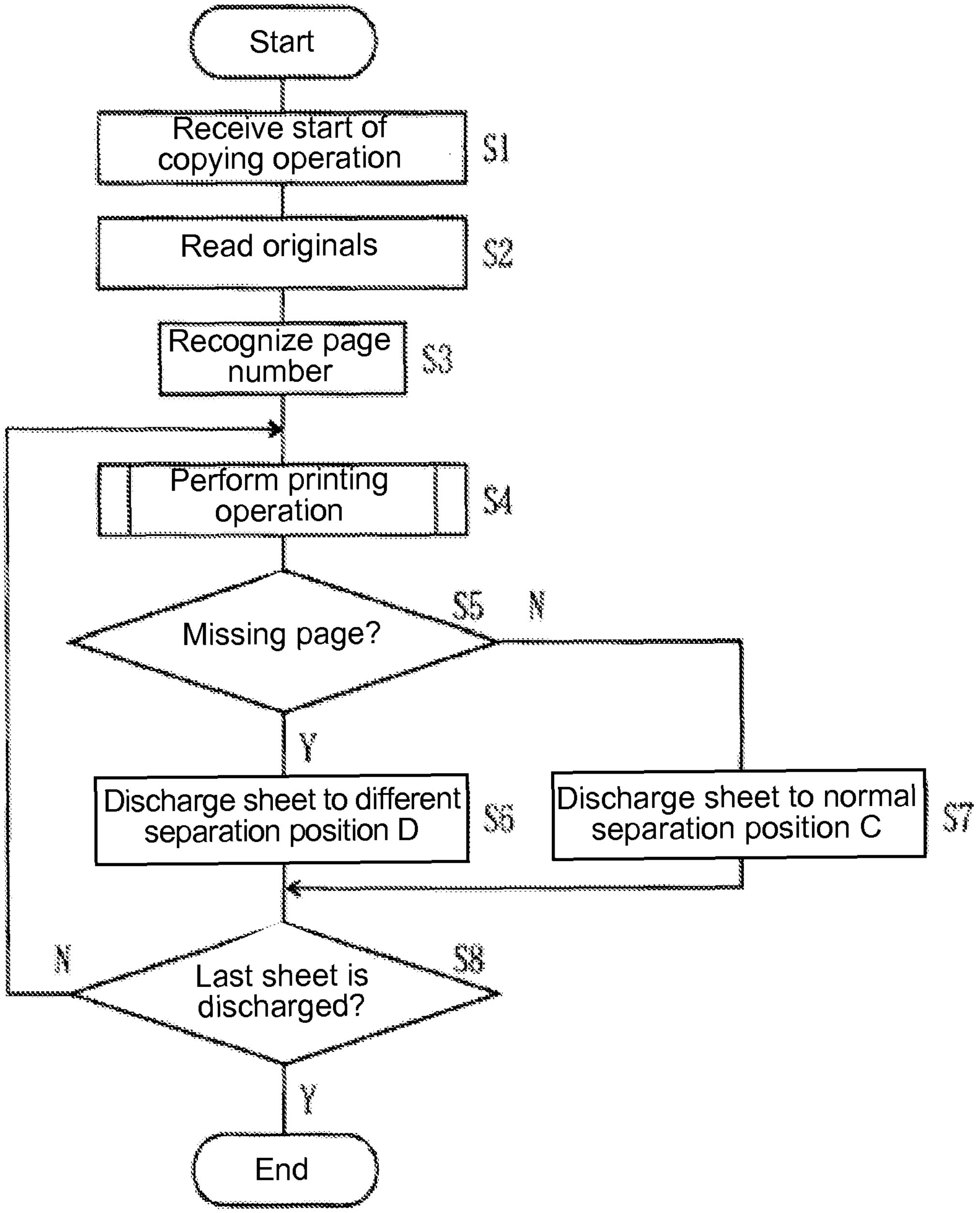
FIG. 7 is a flow chart showing an operation of the copier according to the first embodiment of the present invention.
Figure 8:
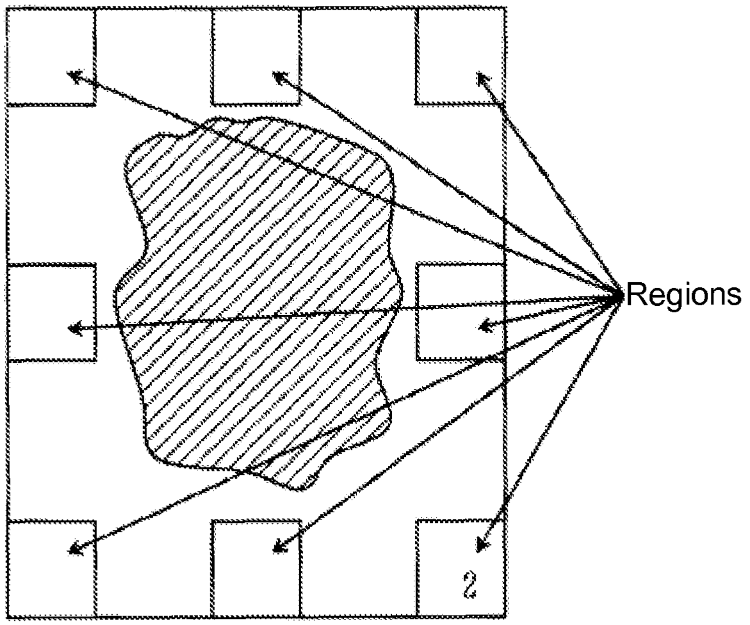
FIG. 8 is a schematic view No. 1 showing a method of recognizing a page number according to the first embodiment of the present invention.
Figure 9:
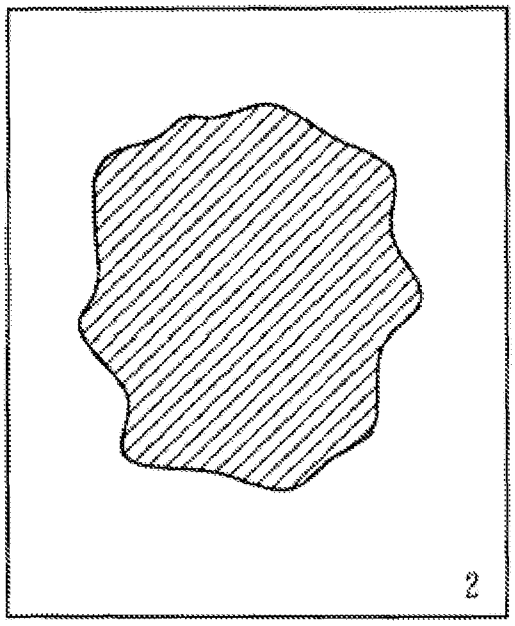
FIG. 9 is a schematic view No. 2 showing the method of recognizing the page number according to the first embodiment of the present invention.

FIG. 7 is a flow chart showing an operation of the copier according to the first embodiment of the present invention. FIG. 8 is a schematic view No. 1 showing a method of recognizing the page number according to the first embodiment of the present invention. FIG. 9 is a schematic view No. 2 showing the method of recognizing the page number according to the first embodiment of the present invention.

Figures 10, 11:
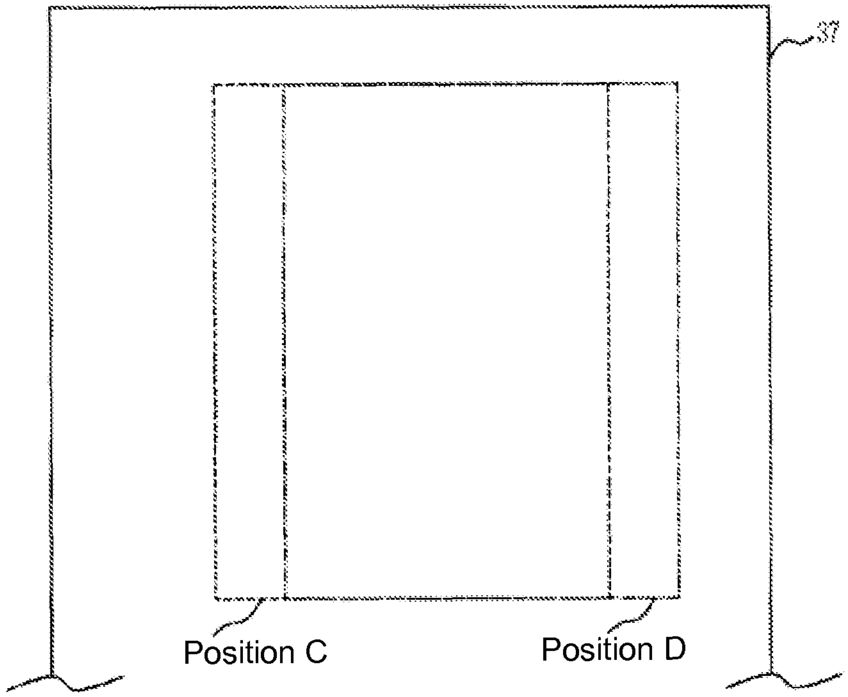
FIG. 10 is a schematic view showing an operation of a missing page determining portion of the copier according to the first embodiment of the present invention.
FIG. 11 is a schematic view showing a discharge position of a sheet of the copier according to the first embodiment of the present invention.
Figure 12:
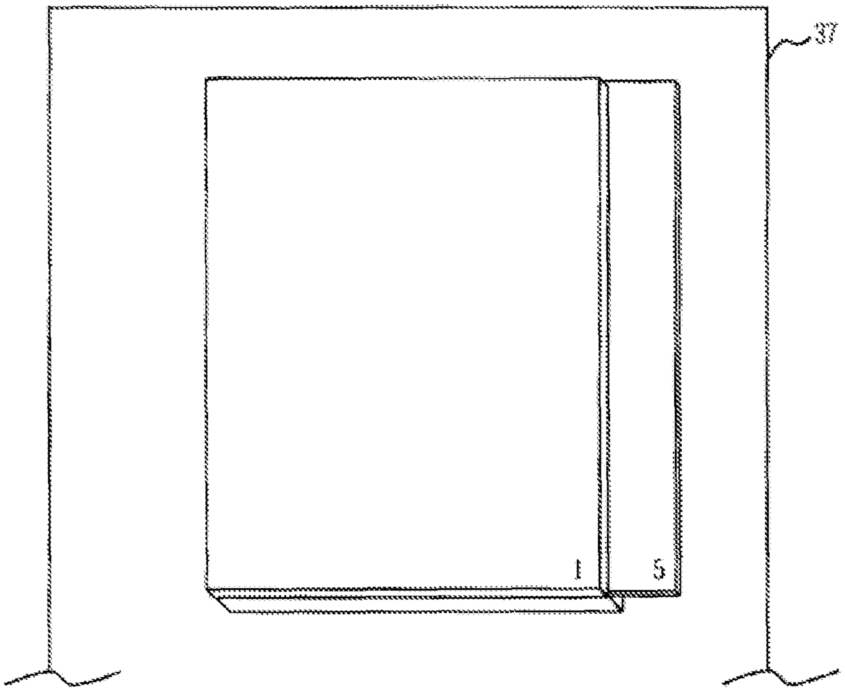
FIG. 12 is a schematic view showing the sheets of the copier in a discharged state according to the first embodiment of the present invention.

FIG. 10 is a schematic view showing an operation of the missing page determining portion of the copier according to the first embodiment of the present invention. FIG. 11 is a schematic view showing the discharge position of the sheet of the copier according to the first embodiment of the present invention. FIG. 12 is a schematic view showing the sheets of the copier in a discharged state according to the first embodiment of the present invention.

In the embodiment, when an operator operates the ten-key 302 (refer to FIG. 6) to input a copy number, and pushes the sheet selection button 305 to select a sheet size, the CPU 102 stores setting information regarding the copy number, the size of the sheet 14, and the like in the RAM 103, thereby receiving a start of the copying operation.

In the next step, when the operator pushes the start button 303, the transportation roller 53 transports the original placed on the original placing portion 51 into the transportation path 61. Then, the original passes on the second platen glass 72B, so that the reading mechanism portion 70 reads the image on the original. The image data of the image thus read are transmitted to the printer portion 101. When the printer portion 101 receives the image data through the scanner IF 120, the printer portion 101 stores the image data in the image storage unit 502.

When the missing page occurs in the originals, it is difficult for the operator to identify the missing page in the bundle of the sheets 14 after the copying operation is performed. To this end, in the embodiment, the copier is configured such that it is possible to identify the missing page according to the image data.

In the embodiment, in the missing page determining portion, the text recognizing unit 161 recognizes the page number according to the image data stored in the image storage unit 502, and stores the page number in the page number storage unit 162.

In general, as shown in FIG. 8, the sheet number of the original is situated near an outer circumference of the original, i.e., one of an upper left corner, an upper side, an upper right corner, a left side, a right side, a lower left corner, a lower side, and a lower right corner. In most cases, for example, the sheet number is situated at the lower right corner as shown in FIG. 9.

Accordingly, the text recognizing unit 161 retrieves the image data of each of the regions from the image storage unit 502. Then, the text recognizing unit 161 recognizes the page number according to the sheet number in the image data, and stores the page number in the page number storage unit 162. Afterward, the printing unit 500 retrieves the image data stored in the image storage unit 502 and performs the printing operation.

In the next step, the determining unit 163 determines whether the missing page occurs according to the page number stored in the page number storage unit 162. More specifically, the determining unit 163 compares the sheet number printed on the sheet 14 immediately discharged with the sheet number printed on the sheet 14 subsequently discharged. When the sheet number printed on the sheet 14 immediately discharged is continuous with the sheet number printed on the sheet 14 subsequently discharged, the page number storage unit 162 determines that the missing page does not occur. When the sheet number printed on the sheet 14 immediately discharged is not continuous with the sheet number printed on the sheet 14 subsequently discharged, the page number storage unit 162 determines that the missing page occurs.

In the next step, the determining unit 163 compares the sheet number printed on the sheet 14 immediately discharged with the sheet number printed on the sheet 14 previously discharged. When the sheet number printed on the sheet 14 immediately discharged is continuous with the sheet number printed on the sheet 14 previously discharged, the page number storage unit 162 determines that the missing page does not occur. When the sheet number printed on the sheet 14 immediately discharged is not continuous with the sheet number printed on the sheet 14 previously discharged, the page number storage unit 162 determines that the missing page occurs.

For example, as shown in FIG. 10, the text recognizing unit 161 recognizes the sheet numbers of 1, 2, 3, 4, 5, 7, 8, 9, 10, 11, and 12. In a case that the sheet number printed on the sheet 14 immediately discharged is 5, the sheet number printed on the sheet 14 previously discharged is 4. In this case, a difference of the sheet numbers is one, and the sheet number printed on the sheet 14 immediately discharged is continuous with the sheet number printed on the sheet 14 previously discharged, so that the page number storage unit 162 determines that the missing page does not occur.

On the other hand, in the case that the sheet number printed on the sheet 14 immediately discharged is 5, the sheet number printed on the sheet 14 subsequently discharged is 7. In this case, the difference of the sheet numbers is two, and the sheet number printed on the sheet 14 immediately discharged is not continuous with the sheet number printed on the sheet 14 subsequently discharged, so that the page number storage unit 162 determines that the missing page occurs.

In the next step, after the page number storage unit 162 determines whether the missing page occurs, the discharge position control unit 501 controls the job separation mechanism 36 to move the discharge roller 15*i*, so that the sheet 14 is discharged to a selected discharge position.

More specifically, as shown in FIGS. 11 and 12, when the page number storage unit 162 determines that the missing page does not occur, the discharge position control unit 501 controls the job separation mechanism 36 to move the discharge roller 15*i*, so that the sheet 14 is discharged to the normal separation position C as the first discharge position on the stacker 37. When the page number storage unit 162 determines that the missing page occurs, the discharge position control unit 501 controls the job separation mechanism 36 to move the discharge roller 15*i*, so that the sheet 14 is shifted by a specific distance in a width direction thereof and discharged to the different separation position D as the second discharge position on the stacker 37.

Accordingly, the sheets 14 corresponding to the sheet numbers of 5 and 7 are discharged to the different separation position D. The sheets 14 corresponding to the sheet numbers of 4, 8, 9, 10, 11, and 12 are discharged to the normal separation position C. After the last sheet is discharged, the operation is completed.

As described above, in the embodiment, when the missing page occurs, the sheets 14 corresponding to the previous original and the subsequent original of the missing page are discharged to the discharge position different from that of the sheets 14 corresponding to the other originals. Accordingly, when the copying operation is completed, the operator can realize that the missing page occurs simply through confirming that a part of the bundle of the sheets 14 is shifted. Further, simply through confirming that the sheets 14 is discharged to the different separation position D, it is possible for the operator to easily identify the original of the missing page from the bundle of the sheets 14 thus copied.

Further, in the embodiment, the operator may perform the copying operation one more time on the original of the missing page. Accordingly, it is possible to easily insert the sheet 14 corresponding to the original of the missing page into a corresponding position of the bundle of the sheets thus copied.

The flow chart shown in FIG. 7 will be explained next. In step S1, the copier receives the start of the copying operation. In step S2, the reading mechanism portion 70 reads the originals. In step S3, the text recognizing unit 161 recognizes the page number according to the image data. In step S4, the printing unit 500 performs the printing operation.

In step S5, the determining unit 163 determines whether the missing page occurs. When the page number storage unit 162 determines that the missing page occurs, the process proceeds to step S6. When the page number storage unit 162 determines that the missing page does not occur, the process proceeds to step S7.

In step S6, the sheet 14 is discharged to the different separation position D. In step S7, the sheet 14 is discharged to the normal separation position C. In step S8, it is determined whether the last sheet is discharged. When it is determined that the last sheet is discharged, the process is completed. When it is determined that the last sheet is not discharged, the process returns to step S4.

In the embodiment, when the sheet numbers are not continuous, it is determined that the missing page occurs. When the missing page occurs, only the sheets 14 corresponding to the previous original and the subsequent original of the missing page are discharged to the different separation position D. Alternatively, when the sheet numbers are not continuous, the copier may be configured to determine that the missing page occurs afterward. In this case, it is configured to continuously discharge the sheets 14 to the different separation position D during the period of time.

Figure 13:
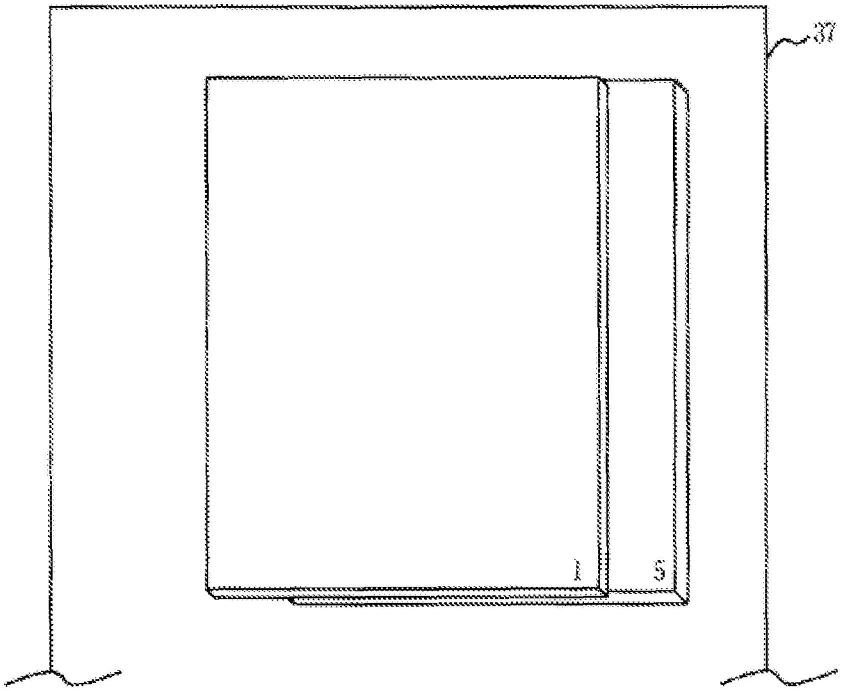
FIG. 13 is a schematic view showing the sheets of the copier in another discharged state according to the first embodiment of the present invention.

FIG. 13 is a schematic view showing the sheets 14 of the copier in another discharged state according to the first embodiment of the present invention.

As shown in FIG. 13, in the discharged state, the sheets 14 from one thereof corresponding to the previous original of the original when the missing page occurs for the first time to one thereof corresponding to the subsequent original of the original when the missing page occurs again are discharged to the different separation position D.

More specifically, similar to the example shown in FIG. 10, the text recognizing unit 161 recognizes the sheet numbers of 1, 2, 3, 4, 5, 7, 8, 9, 10, 11, and 12. In this case, the sheets 14 corresponding to the sheet numbers of 5, 7, 8, 9, 10, 11, and 12 are discharged to the different separation position D.

Second Embodiment

A second embodiment of the present invention will be explained. In the second embodiment, components similar to those in the first embodiment are designated with the same reference numerals, and explanations thereof are omitted. The components similar to those in the first embodiment provide an effect similar to that in the first embodiment.

Figure 14:
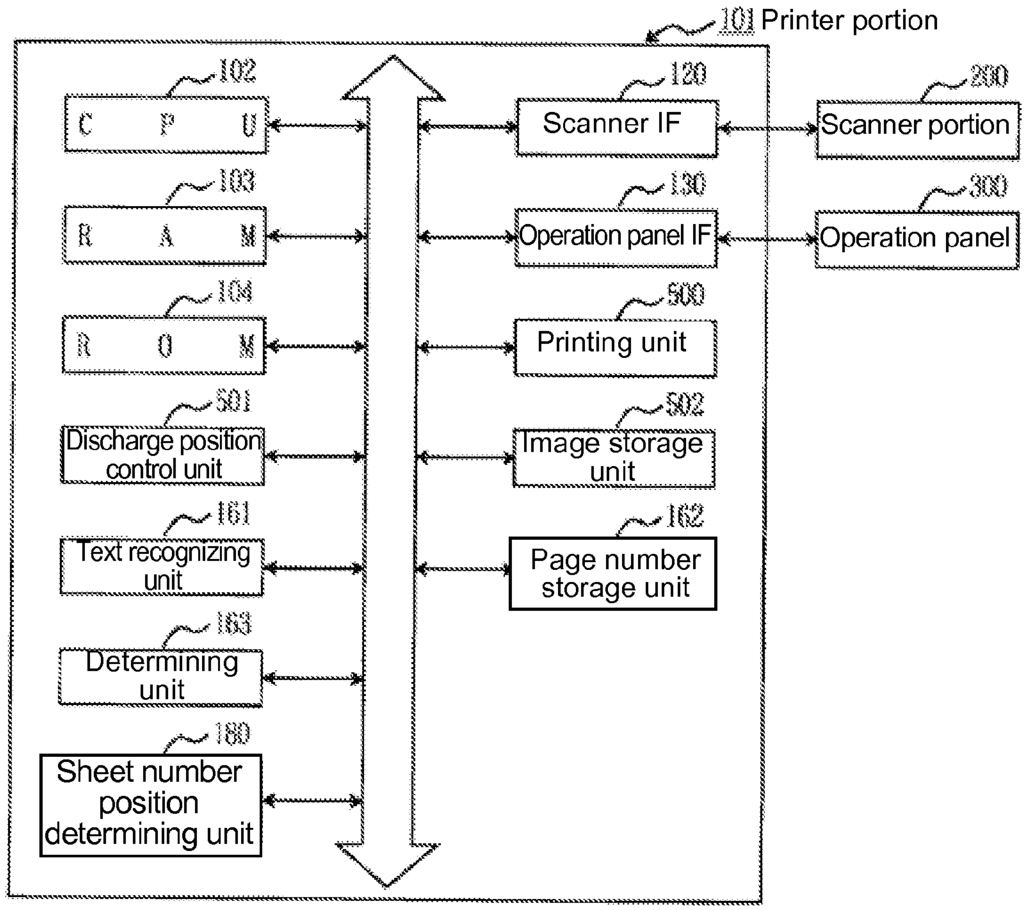
FIG. 14 is a block diagram showing a control system of a copier according to a second embodiment of the present invention.
Figure 15:
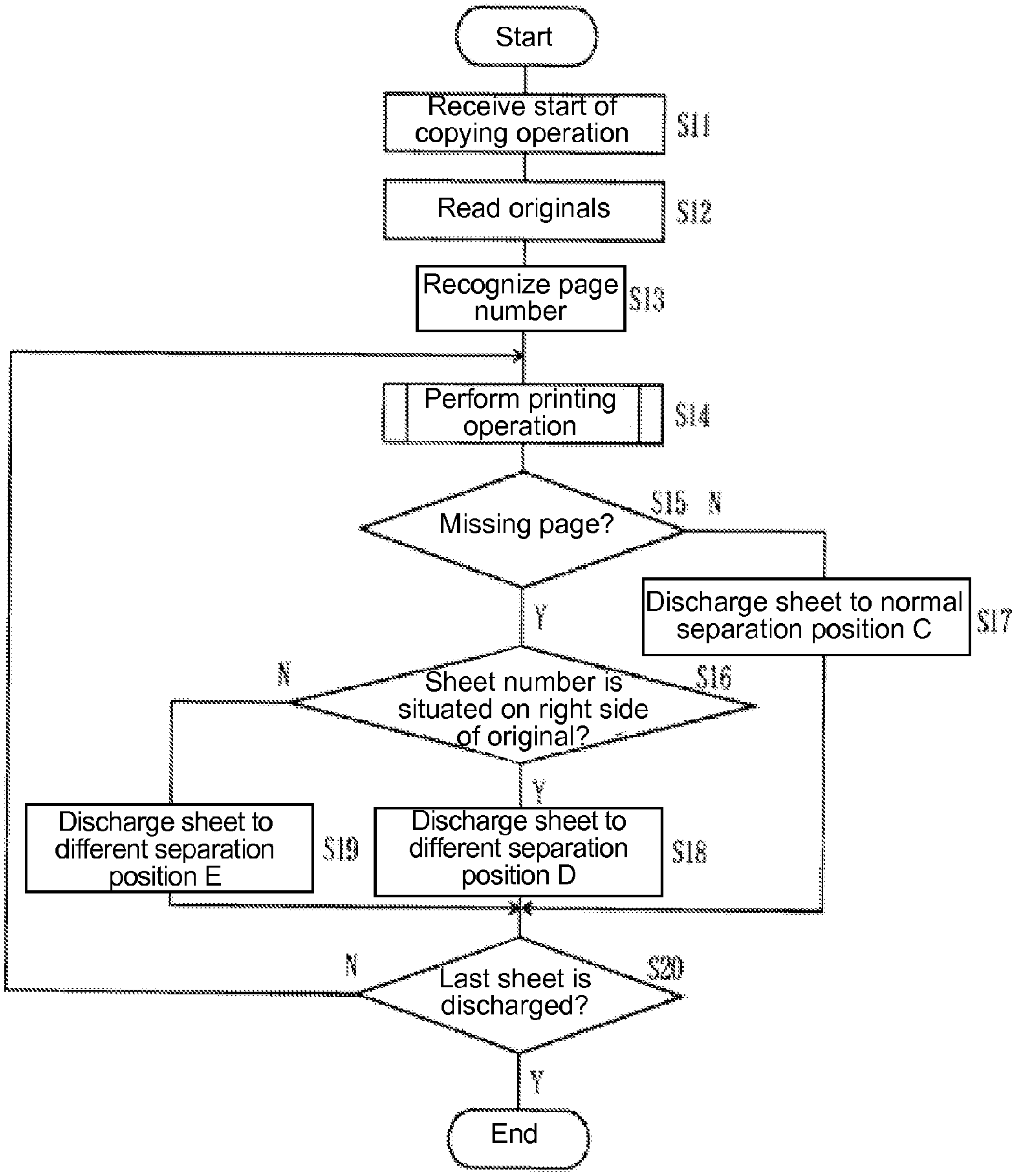
FIG. 15 is a flow chart showing an operation of the copier according to the second embodiment of the present invention.

FIG. 14 is a block diagram showing a control system of a copier according to the second embodiment of the present invention. FIG. 15 is a flow chart showing an operation of the copier according to the second embodiment of the present invention.

Figure 16:
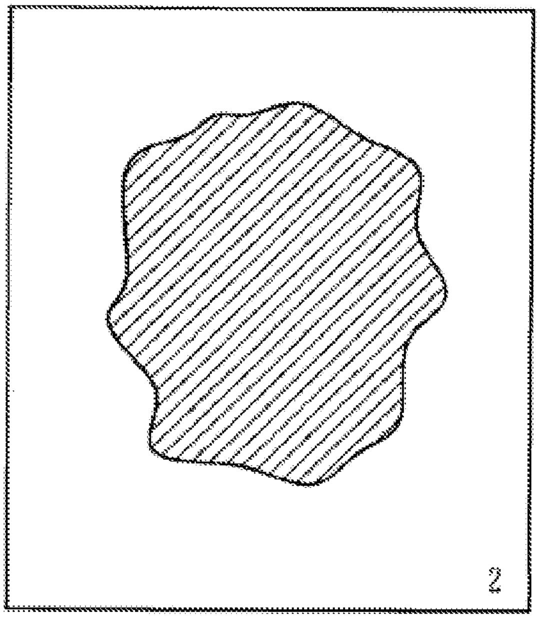
FIG. 16 is a schematic view showing a sheet of the copier, in which a sheet number of the sheet is situated at a specific position, according to the second embodiment of the present invention.
Figure 17:
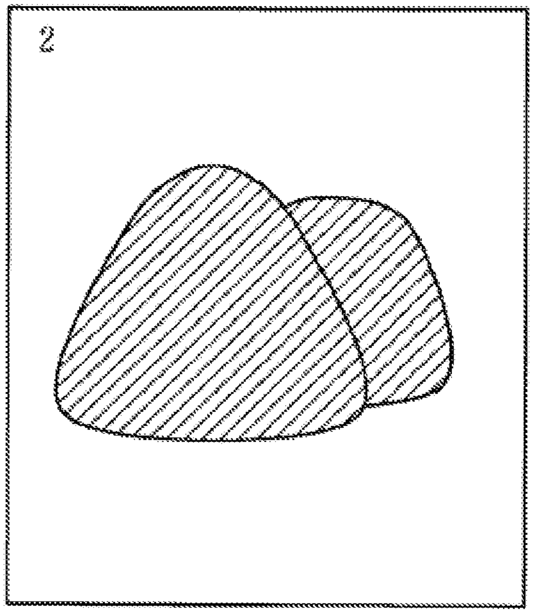
FIG. 17 is a schematic view showing a sheet of the copier, in which a sheet number of the sheet is situated at another specific position, according to the second embodiment of the present invention.

FIG. 16 is a schematic view showing a sheet of the copier, in which a sheet number of the sheet is situated at a specific position, according to the second embodiment of the present invention. FIG. 17 is a schematic view showing a sheet of the copier, in which a sheet number of the sheet is situated at another specific position, according to the second embodiment of the present invention.

Figure 18:
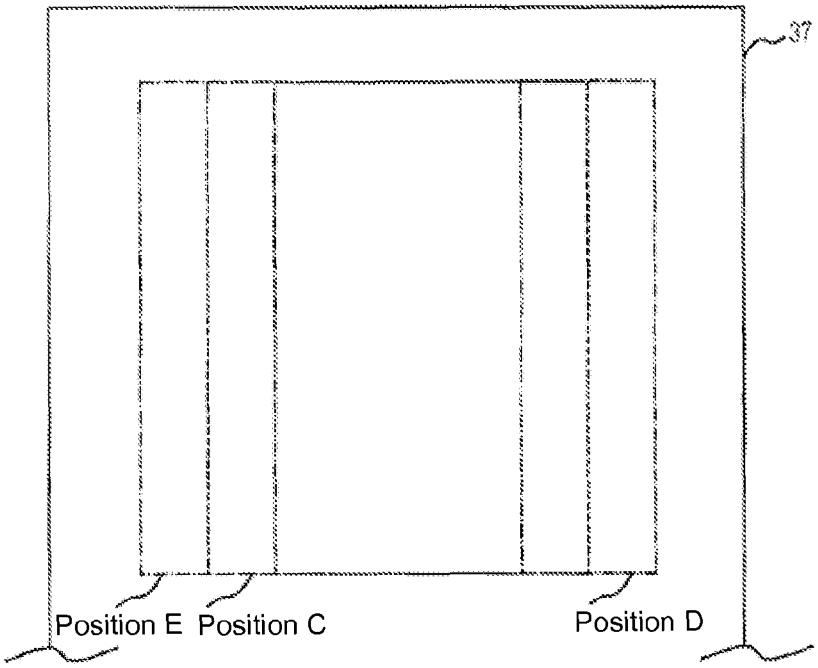
FIG. 18 is a schematic view showing a discharge position of the sheet of the copier according to the second embodiment of the present invention.
Figure 19:
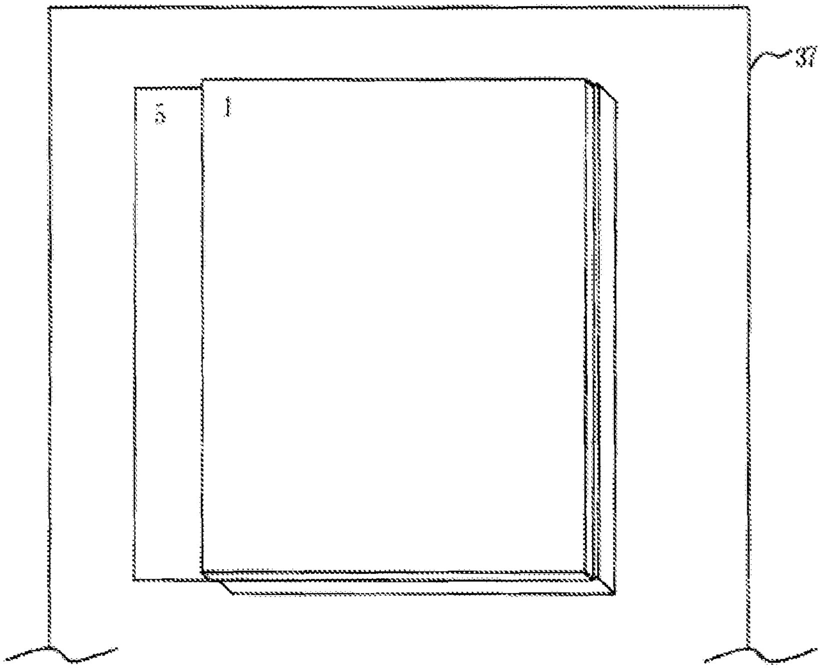
FIG. 19 is a schematic view showing the sheets of the copier in a discharged state according to the second embodiment of the present invention.

FIG. 18 is a schematic view showing a discharge position of the sheet of the copier according to the second embodiment of the present invention. FIG. 19 is a schematic view showing the sheets of the copier in a discharged state according to the second embodiment of the present invention.

As shown in FIG. 14, the control system includes a sheet number position determining unit 180 for determining a position of the sheet number assigned to the original.

In the embodiment, the text recognizing unit 161, the page number storage unit 162, the determining unit 163 and the sheet number position determining unit 180 constitute the missing page determining portion for determining whether the missing page occurs. Further, the CPU 102 as the calculation unit, the RAM 103 as the first storage unit, the ROM 104 as the second storage unit, and the missing page determining portion constitute a control unit for controlling an entire operation of the printer portion 101.

In the embodiment, when the operator operates the ten-key 302 (refer to FIG. 6) to input the copy number, and pushes the sheet selection button 305 as a medium selection unit to select the sheet size, the CPU 102 stores the setting information regarding the copy number, the size of the sheet 14, and the like in the RAM 103, thereby receiving the start of the copying operation.

In the next step, when the operator pushes the start button 303 as a start unit, the transportation roller 53 transports the originals placed on the original placing portion 51 (refer to FIG. 5) into the transportation path 61. Then, the originals pass on the second platen glass 72B, so that the reading mechanism portion 70 reads the images. The image data of the image thus read are transmitted to the printer portion 101. When the printer portion 101 receives the image data through the scanner IF 120, the printer portion 101 stores the image data in the image storage unit 502 as the first storage unit.

In the embodiment, in the printer portion 101, the text recognizing unit 161 of the missing page determining portion retrieves the image data stored in the image storage unit 502, and retrieves the image data of each of the regions. Then, the text recognizing unit 161 recognizes the page number, and stores the page number in the page number storage unit 162. Afterward, the printing unit 500 retrieves the image data stored in the image storage unit 502 and performs the printing operation.

In the next step, the determining unit 163 determines whether the missing page occurs according to the page number stored in the page number storage unit 162. More specifically, the determining unit 163 compares the sheet number printed on the sheet 14 immediately discharged with the sheet number printed on the sheet 14 subsequently discharged. When the sheet number printed on the sheet 14 immediately discharged is continuous with the sheet number printed on the sheet 14 subsequently discharged, the page number storage unit 162 determines that the missing page does not occur. When the sheet number printed on the sheet 14 immediately discharged is not continuous with the sheet number printed on the sheet 14 subsequently discharged, the page number storage unit 162 determines that the missing page occurs.

In the next step, the determining unit 163 compares the sheet number printed on the sheet 14 immediately discharged with the sheet number printed on the sheet 14 previously discharged. When the sheet number printed on the sheet 14 immediately discharged is continuous with the sheet number printed on the sheet 14 previously discharged, the page number storage unit 162 determines that the missing page does not occur. When the sheet number printed on the sheet 14 immediately discharged is not continuous with the sheet number printed on the sheet 14 previously discharged, the page number storage unit 162 determines that the missing page occurs.

In the embodiment, when the missing page occurs, the sheet number position determining unit 180 determines the position of the sheet number assigned to the original. More specifically, the sheet number position determining unit 180 recognizes the page number according to the image data stored in the image storage unit 502, and determines whether the sheet number is situated on the right side (the upper right corner or the lower right corner) of the outer circumference of the original or the left side (the upper left corner or the lower left corner) of the outer circumference of the original. That is, the sheet number is situated on the right side as shown in FIG. 16, or the sheet number is situated on the left side as shown in FIG. 17.

In the next step, after the page number storage unit 162 determines whether the missing page occurs and the sheet number position determining unit 180 determines the position of the sheet number, the discharge position control unit 501 controls the job separation mechanism 36 (refer to FIG. 3) to move the discharge roller 15*i*, so that the sheet 14 is discharged to the selected discharge position.

More specifically, as shown in FIG. 18, when the page number storage unit 162 determines that the missing page does not occur, the discharge position control unit 501 controls the job separation mechanism 36 to move the discharge roller 15*i*, so that the sheet 14 is discharged to the normal separation position C as the first discharge position on the stacker 37. When the page number storage unit 162 determines that the missing page occurs and the sheet number position determining unit 180 determines that the position of the sheet number is on the right side of the circumference of the original, the discharge position control unit 501 controls the job separation mechanism 36 to move the discharge roller 15*i*, so that the sheet 14 is discharged to the different separation position D as the second discharge position on the stacker 37. When the page number storage unit 162 determines that the missing page occurs and the sheet number position determining unit 180 determines that the position of the sheet number is on the left side of the circumference of the original, the discharge position control unit 501 controls the job separation mechanism 36 to move the discharge roller 15*i*, so that the sheet 14 is discharged to a different separation position E as a third discharge position on the stacker 37.

Accordingly, as shown in FIG. 19, when the sheet number position determining unit 180 determines that the position of the sheet number is on the left side of the circumference of the original and the text recognizing unit 161 recognizes the sheet numbers of 1, 2, 3, 4, 5, 7, 8, 9, 10, 11, and 12, the sheets 14 corresponding to the sheet numbers of 5 and 7 are discharged to the different separation position E. When the sheet number position determining unit 180 determines that the position of the sheet number is on the right side of the circumference of the original and the text recognizing unit 161 recognizes the sheet numbers of 1, 2, 3, 4, 5, 7, 8, 9, 10, 11, and 12, the sheets 14 corresponding to the sheet numbers of 5 and 7 are discharged to the different separation position D, and the other sheets 14 are discharged to the normal separation position C.

As described above, in the embodiment, when the missing page occurs, the sheets 14 corresponding to the previous original and the subsequent original of the missing page are shifted toward the side where the sheet number is situated and discharged to the different separation position D or E. Accordingly, when the copying operation is completed, the operator can realize that the missing page occurs simply through confirming that a part of the bundle of the sheets 14 is shifted. Further, simply through confirming the sheets 14 discharged to the different separation position D or E, it is possible to easily identify the original of the missing page from the bundle of the sheets 14 thus copied.

Further, in the embodiment, the operator may perform the copying operation one more time on the original of the missing page. Accordingly, it is possible to easily insert the sheet 14 corresponding to the original of the missing page into a corresponding position of the bundle of the sheets thus copied.

The flow chart shown in FIG. 15 will be explained next. In step S11, the copier receives the start of the copying operation. In step S12, the reading mechanism portion 70 reads the originals. In step S13, the text recognizing unit 161 recognizes the page number according to the image data. In step S14, the printing unit 500 performs the printing operation.

In step S15, the determining unit 163 determines whether the missing page occurs. When the page number storage unit 162 determines that the missing page occurs, the process proceeds to step S16. When the page number storage unit 162 determines that the missing page does not occur, the process proceeds to step S17.

In step S16, the sheet number position determining unit 180 determines whether the sheet number is situated on the right side of the original. When the sheet number position determining unit 180 determines that the sheet number is situated on the right side of the original, the process proceeds to step S18. When the sheet number position determining unit 180 determines that the sheet number is not situated on the right side of the original, the process proceeds to step S19.

In step S17, the sheet 14 is discharged to the normal separation position C. In step S18, the sheet 14 is discharged to the different separation position D. In step S19, the sheet 14 is discharged to the different separation position E. In step S20, it is determined whether the last sheet is discharged. When it is determined that the last sheet is discharged, the process is completed. When it is determined that the last sheet is not discharged, the process returns to step S14.

In the first embodiment and the second embodiment, the copiers are explained as the image forming apparatus. Alternatively, the present invention may be applicable to a printer, facsimile, a multi function product and the like.

The disclosure of Japanese Patent Application No. 2009-090401, filed on Apr. 2, 2009, is incorporated in the application by the reference.

While the invention has been explained with reference to the specific embodiments of the invention, the explanation is illustrative and the invention is limited only by the appended claims.

What is claimed is:

1. An image forming apparatus, comprising:

an image reading portion for reading an image of an original to generate image data;

a printing portion for printing the image and a sheet number on a medium as a print medium according to the image data;

a missing page determining portion for determining whether the image reading portion fails to read a specific page of the original; and a discharge position control portion for discharging the medium to a first discharge position when the missing page determining portion determines that the image reading portion does not fail to read the specific page, wherein said discharge position control portion is configured to discharge a previous page of the specific page or a subsequent page of the specific page to a second discharge position different from the first discharge position so that the sheet number can be visibly confirmed when the missing page determining portion determines that the image reading portion fails to read the specific page, said discharge position control portion is configured to discharge the medium corresponding to the image data of a previous original and a subsequent original relative to the original that a missing page occurs to a specific discharge position shifted to a right side in a transportation direction when a page number of the original is located in an outer circumference edge of the original on the right side, and said discharge position control portion is configured to discharge the medium corresponding to the image data of the previous original and the subsequent original relative to the original that the missing page occurs to a specific discharge position shifted to a left side in the transportation direction when the page number of the original is located in the outer circumference edge of the original on the left side.

2. The image forming apparatus according to claim 1, wherein said discharge position control portion includes a job separation mechanism, said job separation mechanism being configured to discharge the medium to the first discharge position or the second discharge position.

3. The image forming apparatus according to claim 1, further comprising a storage portion for storing the image data, and a text recognizing unit for retrieving the sheet number from a specific region of the image data to recognize a page number according to the sheet number, said missing page determining portion determining whether the image reading portion fails to read the specific page according to whether the sheet number is continuous.

4. The image forming apparatus according to claim 3, further comprising a sheet number position determining unit for a position of the sheet number.

5. The image forming apparatus according to claim 1, further comprising a medium placing portion for placing the medium discharged from the discharge position control portion, said medium placing portion having the first discharge position and the second discharge position different from the first discharge position.

6. The image forming apparatus according to claim 5, wherein said medium placing portion has the first discharge position and the second discharge position shifted from the first discharge position in a direction perpendicular to a direction that the medium is discharged.

7. The image forming apparatus according to claim 5, wherein said medium placing portion has the first discharge position and the second discharge position arranged so that the medium at the first discharge position is partially overlapped with that at the second discharge position.

8. The image forming apparatus according to claim 5, wherein said medium placing portion has the first discharge position and the second discharge position arranged so that the medium at the first discharge position is partially shifted from that at the second discharge position and the sheet number of the medium can be visibly confirmed.

9. The image forming apparatus according to claim 1, wherein said discharge position control portion is configured to discharge from the medium corresponding to the image data of a previous original relative to the original that a missing page occurs to the medium corresponding to the image data of a subsequent original relative to the original that the missing page occurs again to a specific discharge position different from that of other medium.

10. An image forming apparatus, comprising:

an image reading portion for reading an image of an original to generate image data;

a printing portion for printing the image and a sheet number on a medium as a print medium according to the image data;

a missing page determining portion for determining whether the image reading portion fails to read a specific page of the original; and a discharge position control portion for discharging the medium to a first discharge position when the missing page determining portion determines that the image reading portion does not fail to read the specific page, wherein said discharge position control portion is configured to discharge a previous page of the specific page or a subsequent page of the specific page to a second discharge position different from the first discharge position so that the sheet number can be visibly confirmed when the missing page determining portion determines that the image reading portion fails to read the specific page, said discharge position control portion is configured to discharge the medium corresponding to the image data of a previous original and a subsequent original relative to the original that a missing page occurs to a specific discharge position shifted to a right side in a transportation direction when a page number of the original is located in an outer circumference edge of the original on an upper right side, a middle right side, or a lower right side, and said discharge position control portion is configured to discharge the medium corresponding to the image data of the previous original and the subsequent original relative to the original that the missing page occurs to a specific discharge position shifted to a left side in the transportation direction when the page number of the original is located in the outer circumference edge of the original on an upper left side, a middle left side, or a lower left side.

11. The image forming apparatus according to claim 10, wherein said discharge position control portion includes a job separation mechanism, said job separation mechanism being configured to discharge the medium to the first discharge position or the second discharge position.

12. The image forming apparatus according to claim 10, further comprising a storage portion for storing the image data, and a text recognizing unit for retrieving the sheet number from a specific region of the image data to recognize a page number according to the sheet number, said missing page determining portion determining whether the image reading portion fails to read the specific page according to whether the sheet number is continuous.

13. The image forming apparatus according to claim 12, further comprising a sheet number position determining unit for a position of the sheet number.

14. The image forming apparatus according to claim 10, further comprising a medium placing portion for placing the medium discharged from the discharge position control portion, said medium placing portion having the first discharge position and the second discharge position different from the first discharge position.

15. The image forming apparatus according to claim 14, wherein said medium placing portion has the first discharge position and the second discharge position shifted from the first discharge position in a direction perpendicular to a direction that the medium is discharged.

16. The image forming apparatus according to claim 14, wherein said medium placing portion has the first discharge position and the second discharge position arranged so that the medium at the first discharge position is partially overlapped with that at the second discharge position.

17. The image forming apparatus according to claim 14, wherein said medium placing portion has the first discharge position and the second discharge position arranged so that the medium at the first discharge position is partially shifted from that at the second discharge position and the sheet number of the medium can be visibly confirmed.

18. The image forming apparatus according to claim 10, wherein said discharge position control portion is configured to discharge from the medium corresponding to the image data of a previous original relative to the original that a missing page occurs to the medium corresponding to the image data of a subsequent original relative to the original that the missing page occurs again to a specific discharge position different from that of other medium.

* * * * *